United States Patent [19]

Farwell et al.

[11] Patent Number: 5,050,630

[45] Date of Patent: Sep. 24, 1991

[54] SELF-POSITIONING RUPTURE DISK ASSEMBLY

[75] Inventors: Stephen Farwell, Owasso; Arnold L. Mundt, Tulsa, both of Okla.

[73] Assignee: BS&B Safety Systems, Inc., Tulsa, Okla.

[21] Appl. No.: 620,904

[22] Filed: Dec. 3, 1990

[51] Int. Cl.[5] .............................. F16K 17/14
[52] U.S. Cl. ..................... 137/68.1; 220/89.3
[58] Field of Search ............ 137/68.1; 220/89.1, 220/89.2, 89.3; 285/364, 406, 910

[56] References Cited

U.S. PATENT DOCUMENTS

| | | | |
|---|---|---|---|
| 2,178,178 | 10/1939 | McKeever | 220/89 |
| 2,194,159 | 3/1940 | Bonyun et al. | 220/89 |
| 2,225,220 | 12/1940 | Huff | 220/89 |
| 3,169,658 | 2/1965 | Porter | 220/89 |
| 3,815,779 | 6/1974 | Ludwig et al. | 220/89 A |
| 3,872,874 | 3/1975 | Nedelec et al. | 137/68 |
| 3,881,629 | 5/1975 | Shaw et al. | 220/89 A |
| 4,046,280 | 9/1977 | Hansen | 220/89 A |
| 4,207,913 | 6/1980 | Fike | 137/68 R |
| 4,219,040 | 8/1980 | Fallon et al. | 137/68 R |
| 4,505,289 | 3/1985 | Wilson | 137/68 R |
| 4,553,559 | 11/1985 | Short, III | 137/68.1 R |
| 4,819,823 | 4/1989 | Kadakia et al. | 220/89 A |

Primary Examiner—Martin P. Schwadron
Assistant Examiner—Kevin L. Lee
Attorney, Agent, or Firm—Laney, Dougherty, Hessin & Beavers

[57] ABSTRACT

A self-positioning rupture disk assembly which includes a rupture disk clamped between supporting members. A gasket member is attached to a peripheral portion of the rupture disk for providing a seal between at least one side of the rupture disk and the adjacent supporting member. A first protuberance is formed on the gasket member which is received by a complimentary recess in the adjacent supporting member whereby when the rupture disk and gasket member are clamped between the supporting members with the protuberance positioned within the recess, the rupture disk is aligned between the supporting members with the inlet and outlet sides thereof positioned adjacent the inlet and outlet supporting members, respectively.

20 Claims, 1 Drawing Sheet

SELF-POSITIONING RUPTURE DISK ASSEMBLY

BACKGROUND OF THE INVENTION

1. Field of the Invention

The present invention relates generally to self-positioning rupture disk assemblies, and more particularly, to such assemblies wherein the rupture disk includes a positioning part or parts which coact with the supporting members to insure proper positioning of the rupture disk between the supporting members.

2. Description of the Prior Art

A number of different pressure relief devices of the rupture disk type have been developed and used heretofore. Generally, such devices include a rupture disk supported between a pair of support members or flanges which are connected to a fluid flow passageway communicated with a vessel or system containing fluid under pressure. When the fluid pressure within the vessel or system exceeds the design rupture pressure of the rupture disk, rupture occurs causing pressurized fluid to be relieved from the vessel or system by way of the passageway.

The rupture disks utilized heretofore have taken various forms. For example, the rupture disks have been of various pheripheral shapes, most generally circular, and have been of the tension rupture (conventional) or compression rupture (reverse buckling) types. The rupture disks have also been comprised of a single part or multiple parts. In addition, the rupture disks have been of various configurations including flat, domed, conical, truncated conical, etc.

The supporting members utilized heretofore have also taken various shapes, and various forms of gaskets and sealing surfaces have been utilized to effect seals between rupture disks and the supporting members. Various means have also been utilized for clamping the supporting members together, e.g., a plurality of studs and nuts, bolts, ferrule type clamping rings, threaded union connectors, etc.

A problem common to most all of the heretofore utilized rupture disk assemblies is the inadvertent improper installation of the various parts of the assemblies. If the rupture disk is installed upside down in a rupture disk-supporting member assembly whereby the inlet side of the rupture disk is not adjacent the inlet supporting member, improper operation can result. For example, when a reverse buckling rupture disk is installed upside down between supporting members, the fluid pressure required to rupture the disk in tension can be considerably higher than the design reverse buckling rupture pressure of the disk. This in turn can bring about disastrous results.

Various methods and apparatus have been developed and used heretofore to prevent improper installation of rupture disk assemblies, and particularly, to prevent the installation of the rupture disks upside down in the supporting members and/or the misalignment of the rupture disks between the supporting members. For example, U.S. Pat. No. 3,815,779 issued Jun. 11, 1974 discloses a rupture disk assembly wherein the annular flat portion of the rupture disk includes a plurality of apertures therein for engagement by upstanding posts attached to one of the supporting members which fit into recesses disposed in the other supporting member. The spacing of the posts, apertures and recesses is such that the rupture disk can not be installed upside down and the rupture disk and supporting members are automatically aligned. While such apparatus effectively prevents improper installation, it adds significant production costs to the basic rupture disk assembly.

Thus, there is a need for an improved rupture disk assembly which is self-positioning, but which is simple and inexpensive as compared to heretofore utilized self-positioning or self-aligning rupture disk apparatus.

SUMMARY OF THE INVENTION

The present invention fulfills the need set forth above by providing a self-positioning rupture disk assembly which is simple and economical to produce. The rupture disk assembly basically comprises inlet and outlet rupture disk supporting members adapted for attachment in a fluid flow passageway, and means for clamping the supporting members together. A rupture disk is clamped between the supporting members for closing the flow passageway until a predetermined fluid pressure is exerted thereon having an inlet side positioned adjacent the inlet supporting member and an outlet side positioned adjacent the outlet supporting member. A gasket member is attached to a peripheral portion of the rupture disk which provides a seal between at least one side of the rupture disk and the adjacent supporting member. The gasket member has a first protuberance formed thereon which faces one of the supporting members and that supporting member includes a recess therein for receiving the protuberance. The recess in the supporting member is of a size and position whereby when the rupture disk and gasket member are clamped between the supporting members with the protuberance positioned within the recess, the rupture disk is aligned between the supporting members with the inlet and outlet sides thereof positioned adjacent the inlet and outlet supporting members, respectively.

In a preferred embodiment, the first protuberance faces the inlet supporting member which is received by a complimentary recess therein and the gasket member includes a second protuberance thereon facing the outlet supporting member. The outlet supporting member includes a recess therein for receiving the second protuberance, and the second protuberance and the recess in the outlet supporting member are different in size, or position, or both, from the first protuberance and the recess in the inlet supporting member to further insure that the rupture disk and gasket member are not installed upside down between the supporting members.

It is, therefore, a general object of the present invention to provide a self-positioning rupture disk assembly.

A further object of the present invention is the provision of an improved self-positioning and aligning rupture disk assembly which is relatively simple and economical to produce.

Other and further objects, features and advantages of the present invention will be readily apparent to those skilled in the art upon a reading of the description of preferred embodiments which follows.

DESCRIPTION OF PREFERRED EMBODIMENTS

The present invention provides an improved self-positioning rupture disk and inlet and outlet supporting member assembly which meets the above described need of simplicity and economy. The rupture disk utilized in the assembly can be any of the various designs and types heretofore developed and used including single or multiple part rupture disks which are flat or which include a concave-convex portion, e.g., a domed portion, a conical portion, a pyramidical portion, a truncated conical or pyramidical portion, etc. While rupture disks which are circular in peripheral shape are most commonly used, the peripheral shape of the rupture disk utilized in accordance with the present invention can take any of a variety of shapes including square, triangular, etc. In addition, the rupture disk can be a composite disk, i.e., comprised of various parts such as rupture members, seal members, vacuum supports, etc., and the rupture disk can rupture in tension (in the conventional direction) or in compression (reverse buckling). The inlet and outlet supporting members utilized with the rupture disk can be of any shape corresponding with the rupture disk used. Generally, the inlet and outlet supporting members are annular, and when the rupture disk is a tension rupture type of disk, it includes a concave-convex portion and the concave side is the inlet side. When the rupture disk is a reverse buckling type of disk, it includes a concave-convex portion and the convex side is the inlet side.

Figure 1:
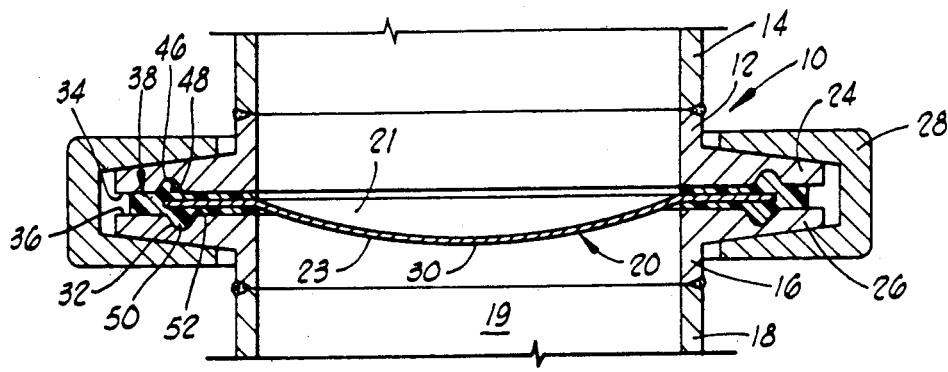
FIG. 1 is a side elevational view of the assembly of the present invention in cross-section.
Figure 2:
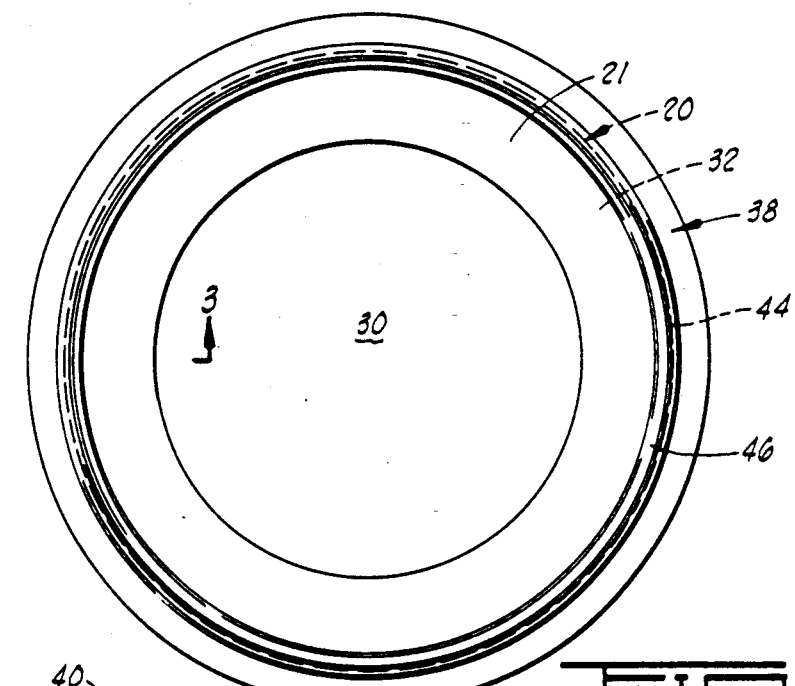
FIG. 2 is a top plan view of the rupture disk and gasket member of the assembly of FIG. 1.
Figure 3:
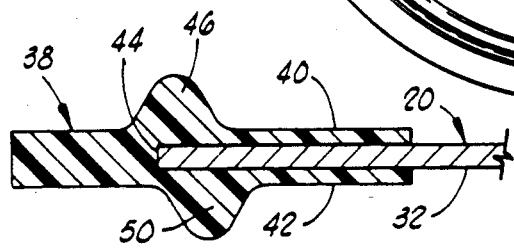
FIG. 3 is an enlarged partial cross-sectional view of the rupture disk and gasket member of FIG. 2 taken along line 3—3 of FIG. 2.

Referring now to the drawings, and particularly to FIGS. 1-3, a presently preferred embodiment of the present invention is illustrated and generally designated by the numeral 10. The apparatus 10 is comprised of an inlet annular supporting member 12 connected to a conduit 14 such as by welding, and an outlet supporting member 16 connected to a conduit 18. As will be understood by those skilled in the art, the conduit 14 is connected to a vessel or system containing fluids under pressure, and the conduit 14, inlet supporting member 12, outlet supporting member 16 and conduit 18 provide a flow passageway 19 through which pressurized fluids can flow to relieve excess fluid pressure from the vessel or system.

A rupture disk 20 having an inlet side 21 and an outlet side 23 and having a gasket member 38 attached thereto is sealingly clamped between the inlet and outlet supporting members 12 and 16. The rupture disk 20 closes the flow passageway 19 until a predetermined fluid pressure from the vessel or system being protected is exerted on the inlet side 21 of the rupture disk 20 by way of the conduit 14 and inlet supporting member 12 whereupon the disk 20 ruptures and fluid pressure is relieved from the vessel or system.

As mentioned above, the inlet and outlet support members 12 and 16 can take various forms and can be clamped together by means of bolts, studs and nuts or other means. In the form illustrated in FIG. 1, the supporting members 12 and 16 are annular and include outwardly extending annular flange portions 24 and 26, respectively. The external surfaces of the flange portions 24 and 26 are tapered, and a conventional ferrule clamping member 28 is connected over the flange portions 24 and 26. As the ferrule clamping member 28 is urged inwardly by locking means (not shown) connected thereto, the flange portions 24 and 26 are forced together.

The rupture disk 20, which in the form illustrated is a conventional domed rupture disk that ruptures in tension, includes a concave-convex portion 30 connected to an annular flat flange portion 32. The annular flat flange portion 32 of the rupture disk 20 extends between opposing partially flat seating surfaces 34 and 36 of the flange portions 24 and 26 of the inlet and outlet supporting members 12 and 16, respectively.

The annular gasket member 38 for providing a seal between the flange portion 32 of the rupture disk 20 and at least one of the supporting members 12 or 16 is attached to a peripheral portion of the rupture disk 20, i.e., to the annular flange portion 32 thereof. As shown in FIG. 1, the gasket member 38 and the flange portion 32 of the rupture disk 20 are clamped between the seating surfaces 34 and 36 of the supporting members 12 and 16, respectively. The gasket member 38 is preferably formed of resilient material and includes relatively flat side portions 40 and 42 attached to the inlet and outlet sides 21 and 23 of the annular flange portion 32 of the rupture disk 20. In the form illustrated in FIGS. 1-3, the gasket member 38 extends outwardly a short distance beyond the peripheral end 44 of the rupture disk 20. A first rounded protuberance 46, which preferably forms an integral annulet (FIG. 2), is provided on the gasket member 38 on the side thereof facing the inlet supporting member 12, and the seating surface 34 of the inlet supporting member 12 includes an annular recess 48 (FIG. 1) formed therein for receiving the protuberance 46. The recess 48 is of a size and position complimentary to the protuberance 46 whereby when the rupture disk 20 and gasket member 38 are clamped between the inlet and outlet supporting members 12 and 16 with the protuberance 46 positioned within the recess 48, the rupture disk 20 is aligned with the supporting member 12 and the inlet side 21 of the rupture disk 20 is positioned adjacent the inlet supporting member 12.

In the presently preferred embodiment illustrated in FIGS. 1-3, a second rounded protuberance 50 forming an integral annulet, which can be of the same or different size and shape as the protuberance 46, is provided on the gasket member 38 facing the seating surface 36 of the outlet supporting member 16. The second protuberance 50 is preferably offset from the protuberance 46 as illustrated, and a recess 52 which is complimentary in size and position to the second protuberance 50 is disposed in the seating surface 36 of the flange portion 26 of the outlet supporting member 16. The second protuberance 50 and the recess 52 in the outlet supporting member 16 function to align and position the rupture disk 20 with the outlet supporting member 16 in the same way as the protuberance 46 and recess 48 in the inlet supporting member 12 align the rupture disk 20 with the inlet supporting member 12. In addition, because the protuberances 46 and 50 as well as their corresponding recesses 48 and 52 are different in position and, optionally, in size, if it is attempted to install the rupture disk 20 upside down between the supporting members 12 and 16, the protuberances will not fit into their respective recesses and the supporting members will not clamp together normally.

Figure 4:
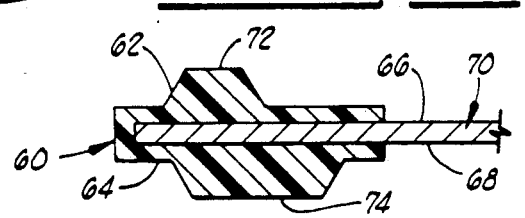
FIG. 4 is an enlarged cross-sectional view similar to FIG. 3, but showing an alternate form of gasket member.

Referring now to FIG. 4, an alternate form of gasket member of the present invention is illustrated and generally designated by the numeral 60. The gasket member 60 is comprised of two connected side portions 62 and 64 attached to the inlet and outlet sides 66 and 68 of the peripheral portion of a rupture disk 70, respectively. The side portion 62 of the gasket member 60 includes a first protuberance 72 having a cross-sectional configuration in the form of a truncated cone. The side portion 64 includes a larger second protuberance 74 also having a truncated cone cross-sectional shape. The gasket member 60 functions in the same manner as the above described gasket member 38 to align and position the rupture disk 70 to which it is attached. That is, the first and second protuberances 72 and 74 fit into complimentary recesses formed in the seating surfaces of the inlet and outlet supporting members utilized with the rupture disk 70 (not shown).

Figure 5:
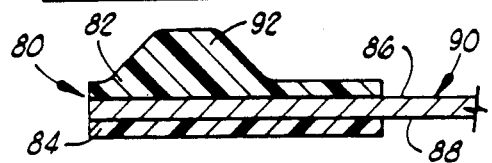
FIG. 5 is an enlarged cross-sectional view similar to FIG. 3, but showing another alternate form of gasket member.

Referring now to FIG. 5, another alternate form of the gasket member of the present invention generally designated by the numeral 80 is illustrated. The gasket member 80 is comprised of two separate gasket elements 82 and 84 which are attached to the inlet and outlet sides 86 and 88 of the peripheral portion of a rupture disk 90. The gasket element 82 includes a protuberance 92 and the gasket element 84 does not include a protuberance. The inlet supporting member (not shown) includes a recess which is complimentary in size, cross-sectional shape and position to the protuberance 92.

The protuberance 92 on the gasket element 82 functions in the same manner as described above in connection with the gasket members 38 and 60 in that if the rupture disk 90 is attempted to be installed upside down between inlet and outlet supporting members, the protuberance 92 will not fit within a complimentary recess in the inlet supporting member and the supporting members will not clamp together normally.

Figure 6:
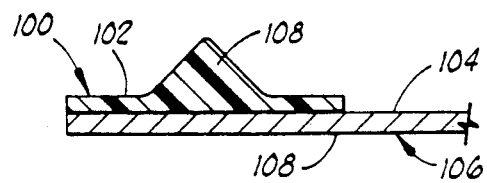
FIG. 6 is an enlarged cross-sectional view similar to FIG. 3, but showing yet another alternate form of gasket member.

Referring now to FIG. 6, still another alternate form of gasket member of the present invention is illustrated and generally designated by the numeral 100. The gasket member 100 is comprised of a single gasket element 102 attached to the inlet side 104 of the peripheral portion of a rupture disk 106. A protuberance 108 which is substantially triangular in cross-sectional shape is formed on the gasket 102. The outlet side 108 of the rupture disk 106 does not include a gasket element. The gasket member 100 functions in the same manner as described above in connection with the gasket member 80 to insure that the rupture disk 106 is not installed upside down.

Figure 7:
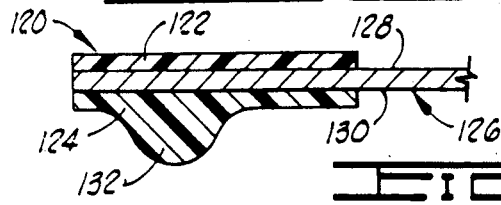
FIG. 7 is an enlarged cross-sectional view similar to FIG. 3, but showing still another alternate form of gasket member.

Referring now to FIG. 7, yet another alternate form of the gasket member of the present invention generally designated by the numeral 120 is illustrated. The gasket member 120 is comprised of two separate gasket elements 122 and 124 which are attached to the inlet and outlet sides 128 and 130 of the peripheral portion of a rupture disk 126. The gasket element 124 includes a protuberance 132 and the gasket element 122 does not include a protuberance. The outlet supporting member (not shown) includes a recess which is complimentary in size, cross-sectional shape and position to the protuberance 132.

The protuberance 132 on the gasket element 124 functions in the same manner as described above in connection with the gasket member 80 in that if the rupture disk 90 is attempted to be installed upside down between inlet and outlet supporting members, the protuberance 132 will not fit within the complimentary recess in the outlet supporting member and the supporting members will not clamp together normally.

When the gasket member of the present invention is an integral member with gasket element portions thereof extending along both sides of the rupture disk as illustrated in FIGS. 3 and 4, the gasket member does not require bonding to the rupture disk. When the gasket member includes individual gasket elements such as those illustrated in FIGS. 5, 6 and 7, the gasket elements are bonded to the sides of the rupture disk using a suitable adhesive.

In general, the one or more protuberances provided on the gasket member of the present invention can each be of any desired cross-sectional shape, and are received by recesses formed in adjacent supporting member seating surfaces which correspond in cross-sectional shape and position therewith. When the gasket member includes first and second protuberances, such protuberances and their corresponding recesses in adjacent supporting members are preferably radially offset in position as shown in FIGS. 3 and 4. The protuberances and corresponding recesses function to align the rupture disk and supporting members and prevent the rupture disk to which the gasket member is attached from being installed upside down as described above.

The present invention, therefore, is well adapted to carry out the objects and attain the ends and advantages mentioned as well as those inherent therein. While various changes in the arrangement and construction of parts may be made by those skilled in the art, such changes are encompassed within the spirit of this invention as defined by the appended claims.

What is claimed is:

1. A self-positioning rupture disk assembly comprising:
   inlet and outlet rupture disk supporting members adapted for attachment in a fluid flow passageway;
   means for clamping said supporting members together connected thereto;
   a rupture disk adapted to be clamped between said supporting members for closing said flow passageway until a predetermined fluid pressure is exerted thereon, said rupture disk having an inlet side positioned adjacent said inlet supporting member and an outlet side-positioned adjacent said outlet supporting member;
   a gasket member attached to a peripheral portion of said rupture disk for providing a seal between at least one side of said rupture disk and the adjacent supporting member and having a first protuberance thereon facing said adjacent supporting member; and
   said adjacent supporting member having a recess therein for receiving said protuberance, said recess being of a size and position whereby when said rupture disk and gasket member are clamped between said supporting members with said protuberance positioned within said recess, said rupture disk is aligned between said supporting member with the inlet and outlet sides thereof positioned adjacent said inlet and outlet supporting members, respectively.

2. The assembly of claim 1 wherein said supporting members and gasket member are annular in shape and said rupture disk is circular.

3. The assembly of claim 2 wherein said first protuberance is an integral annulet formed on said gasket member.

4. The assembly of claim 1 wherein said rupture disk includes a concave-convex portion and the convex side of said rupture disk is the inlet side thereof.

5. The assembly of claim 1 wherein said rupture disk includes a concave-convex portion and the concave side of said rupture disk is the inlet side thereof.

6. The assembly of claim 1 wherein said gasket member provides a seal between both sides of said rupture disk and the adjacent inlet and outlet supporting members.

7. The assembly of claim 6 wherein said gasket member includes a second protuberance thereon facing the other of said supporting members and said supporting member includes a recess therein for receiving said second protuberance.

8. The assembly of claim 7 wherein said second protuberance and said recess in said adjacent supporting member are different in size and position from said first protuberance and said recess in the supporting member adjacent thereto.

9. The assembly of claim 8 wherein said supporting members and gasket member are annular in shape and said rupture disk is circular.

10. The assembly of claim 9 wherein said first and second protuberances are integral annulets formed on said gasket member.

11. The assembly of claim 1 which is further characterized to include a second gasket member for providing a seal between the other side of said rupture disk and the supporting member adjacent thereto.

12. The assembly of claim 11 wherein said second gasket member includes a second protuberance thereon facing said adjacent supporting member, and said adjacent supporting member includes a recess therein for receiving said second protuberance.

13. The assembly of claim 12 wherein said second protuberance and said recess in said adjacent supporting member are different in size and position from said first protuberance and said recess in the supporting member adjacent thereto.

14. A self-positioning rupture disk assembly comprising:

annular inlet and outlet rupture disk supporting members adapted for attachment in a fluid flow passageway;

means for clamping said supporting members together connected thereto;

a circular rupture disk adapted to be clamped between said supporting members for closing said flow passageway until a predetermined fluid pressure is exerted thereon, said rupture disk having an inlet side positioned adjacent said inlet supporting member and an outlet side-positioned adjacent said outlet supporting member;

an annular gasket member attached to a peripheral portion of said rupture disk for providing a seal between the inlet and outlet sides of said rupture disk and the adjacent inlet and outlet supporting members and having a first annular protuberance thereon facing said inlet supporting member; and said inlet supporting member having an annular recess therein for receiving said first annular protuberance, said recess being of a size and position whereby when said rupture disk and gasket member are clamped between said supporting members with said protuberance positioned within said recess, said rupture disk is aligned between said supporting members with the inlet and outlet sides thereof positioned adjacent said inlet and outlet supporting members, respectively.

15. The assembly of claim 14 wherein said gasket members includes a second protuberance thereon facing said outlet supporting member, and said outlet supporting member includes a recess therein for receiving said second protuberance.

16. The assembly of claim 15 wherein said second protuberance and said recess in said outlet supporting member are different in size and position from said first protuberance and said recess in said inlet supporting member.

17. The assembly of claim 16 wherein said rupture disk includes a concave-convex portion and the convex side of said rupture disk is the inlet side thereof.

18. The assembly of claim 16 wherein said rupture disk includes a concave-convex portion and the concave side of said rupture disk is the inlet side thereof.

19. The assembly of claim 16 wherein said rupture disk is flat.

20. The assembly of claim 16 wherein said first and second protuberances are integral rounded annulets and said first protuberance is smaller than said second protuberance.

* * * * *